(12) United States Patent
Stauch et al.

(10) Patent No.: US 8,425,265 B2
(45) Date of Patent: Apr. 23, 2013

(54) ARRANGEMENT WITH A CLAMP OF METAL CONSTRUCTED AS A PIPE PIECE

(75) Inventors: Gert Stauch, Hof (DE); Volker Markgraf, Roeslau (DE); Juergen Krauss, Schlegel (DE); Manfred Baesch, Oberhausen (DE); Martin Zapf, Creussen (DE); Rainer Seebauer, Hof (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 13/358,754

(22) Filed: Jan. 26, 2012

(65) Prior Publication Data

US 2012/0202393 A1 Aug. 9, 2012

(30) Foreign Application Priority Data

Feb. 10, 2011 (EP) ..................................... 11305136

(51) Int. Cl.
*H01R 4/36* (2006.01)
(52) U.S. Cl.
USPC .......................................... 439/814; 439/475
(58) Field of Classification Search .................. 439/814, 439/475, 810
See application file for complete search history.

(56) References Cited

U.S. PATENT DOCUMENTS

| | | | | |
|---|---|---|---|---|
| 4,303,295 | A | * | 12/1981 | Schreder ........................ 439/359 |
| 6,042,430 | A | * | 3/2000 | Hollick ........................... 439/797 |
| 6,321,624 | B1 | | 11/2001 | Croton et al. |
| 7,156,703 | B1 | * | 1/2007 | Hurley et al. .................. 439/814 |

FOREIGN PATENT DOCUMENTS

| | | |
|---|---|---|
| EP | 1626187 | 2/2006 |
| WO | 2010097309 | 9/2010 |

* cited by examiner

*Primary Examiner* — Phuong Dinh
(74) *Attorney, Agent, or Firm* — Sofer & Haroun, LLP

(57) ABSTRACT

An arrangement for fastening an electrical conductor has a clamp (1) constructed as a pipe piece of metal and at least one clamping screw (2) for fastening an electrical conductor (3,4) in the clamp. The clamp has in its wall at least one through-hole provided with a thread for receiving the clamping screw. The clamping screw has a tubular contact part provided with an external thread and adapted to be screwed into the through-hole of the clamp, wherein the contact part has at its one axial end a contact surface for contacting an electrical conductor located in the clamp and along its extension with a circumferential intended breaking point a significant distance from the contact surface.

11 Claims, 6 Drawing Sheets

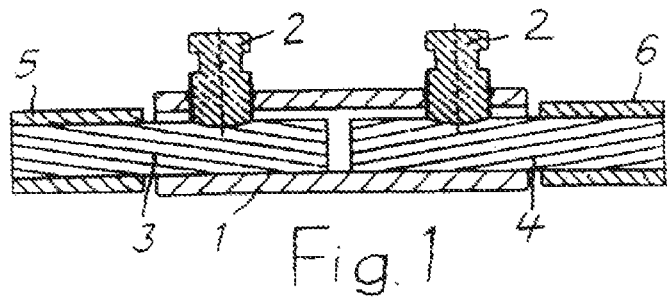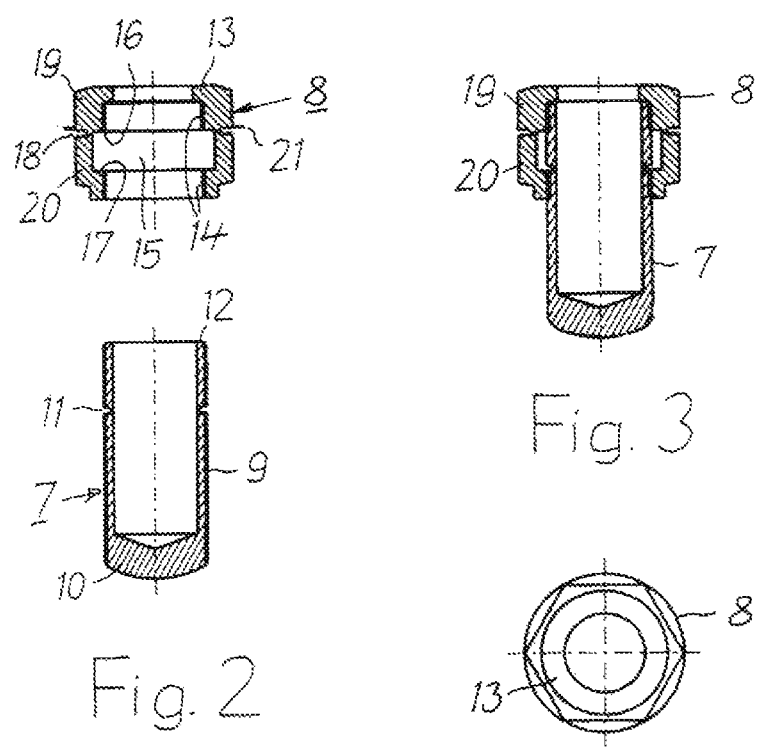

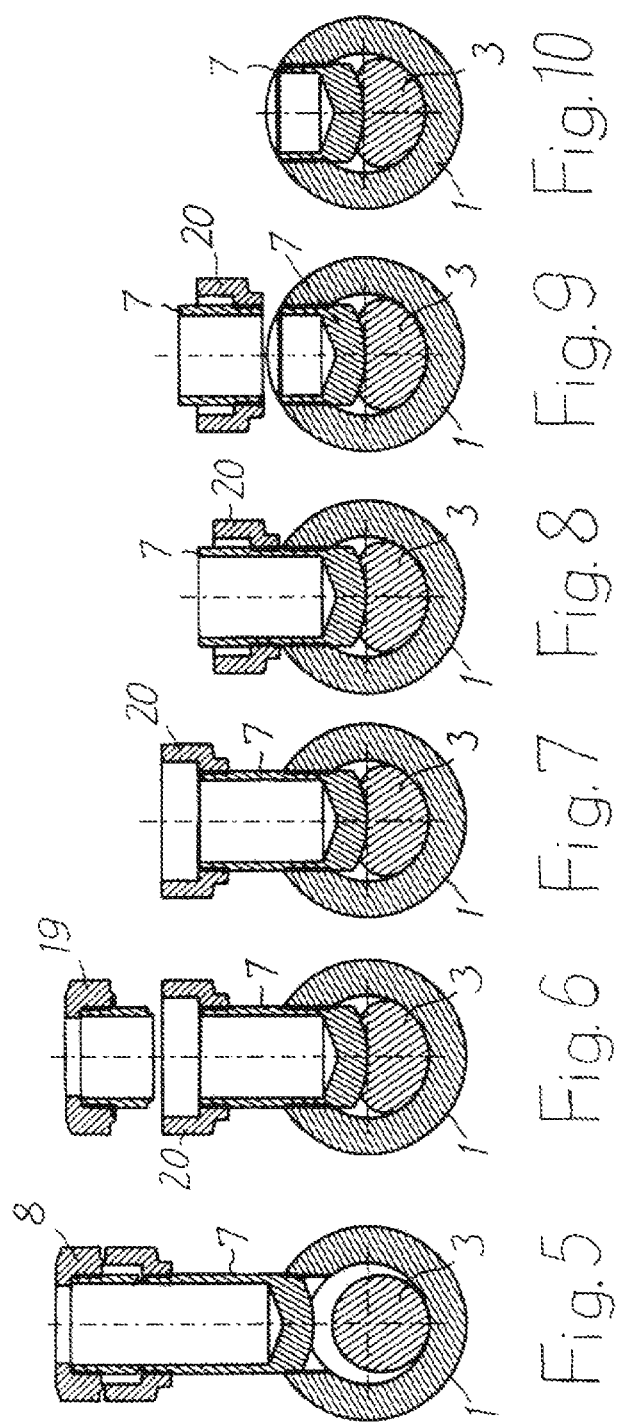

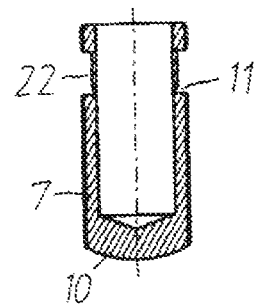
Fig. 11
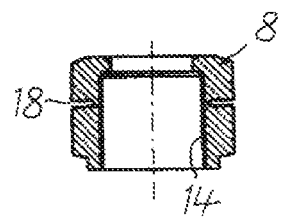
Fig. 12
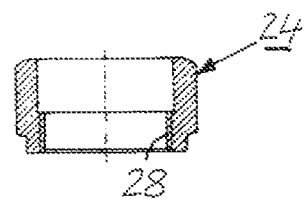
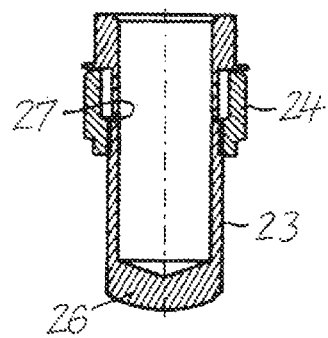
Fig. 14
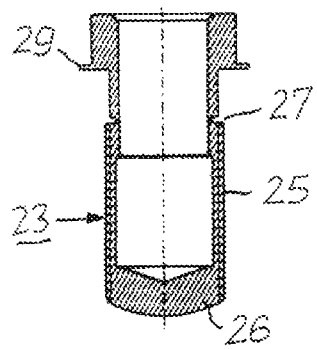
Fig. 13
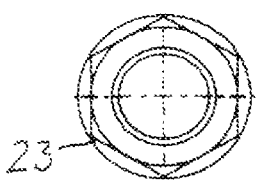
Fig. 15

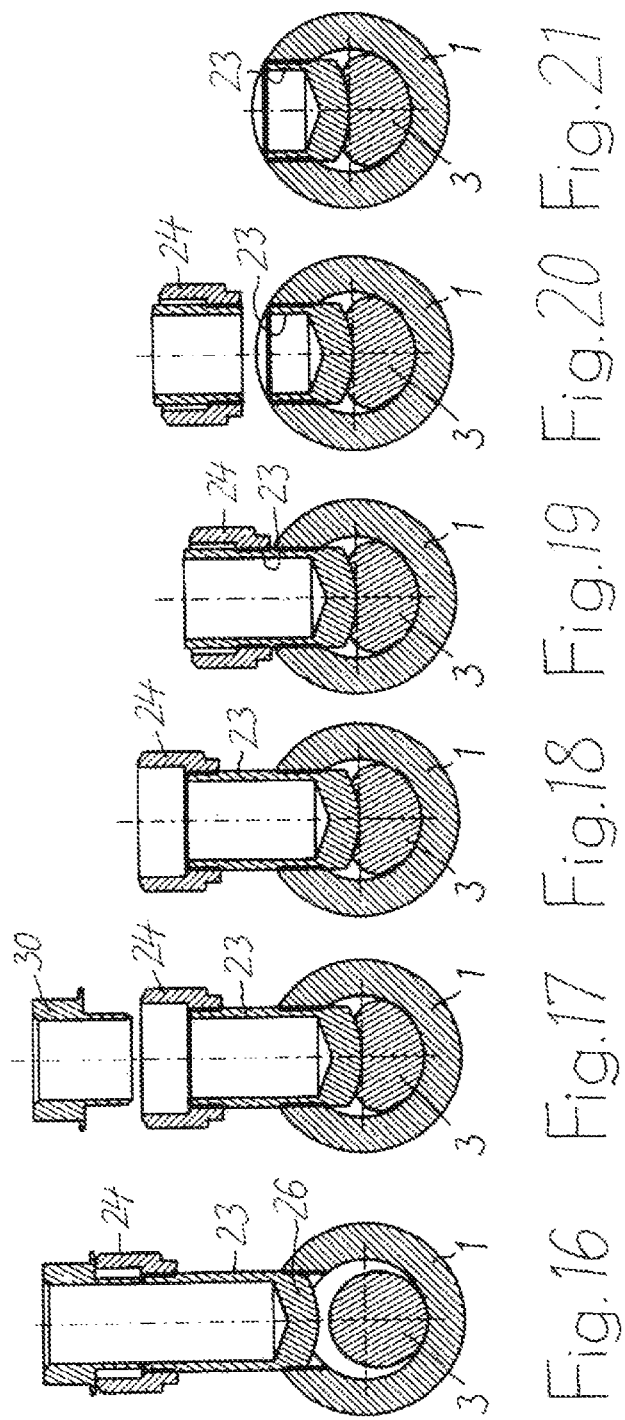

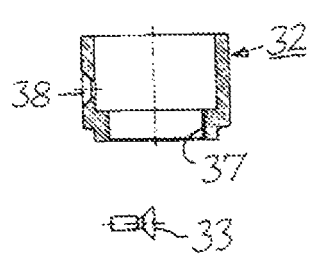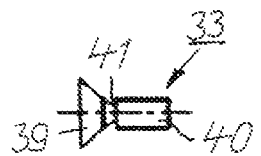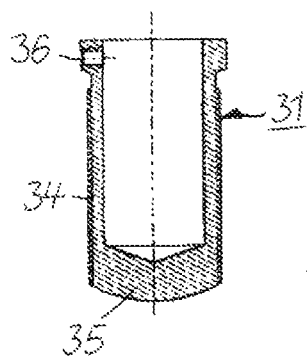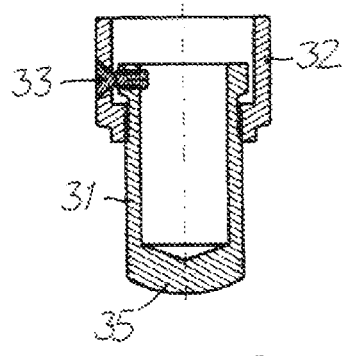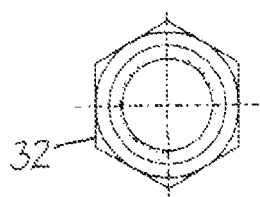

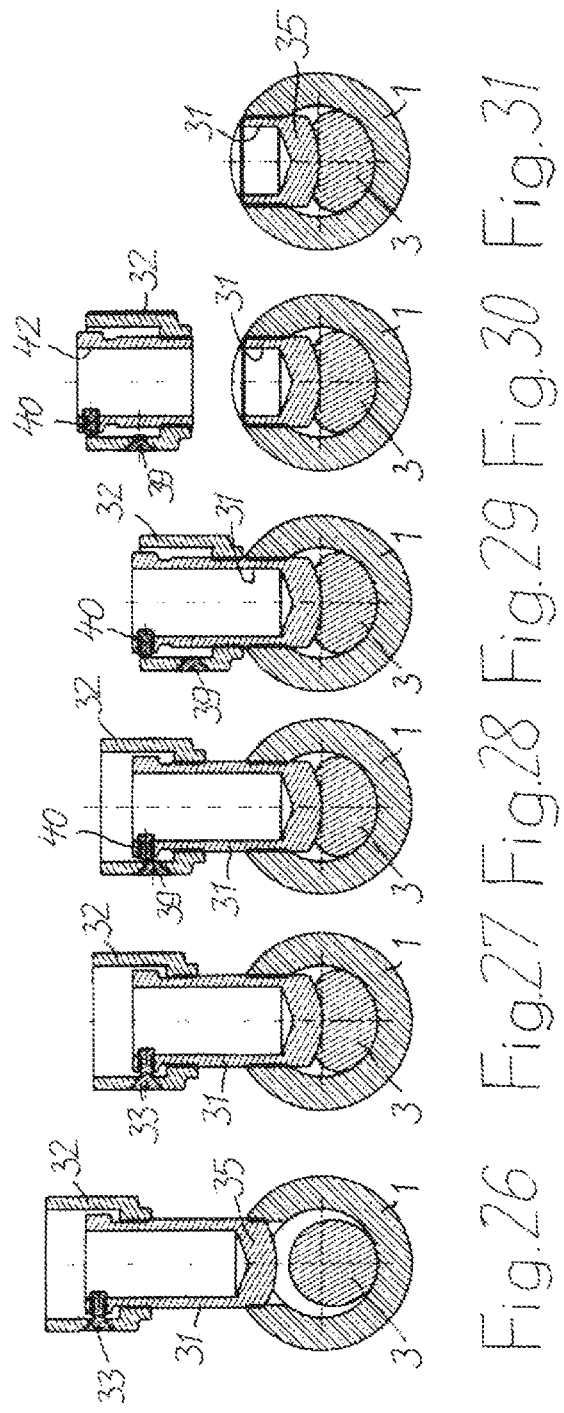

ARRANGEMENT WITH A CLAMP OF METAL CONSTRUCTED AS A PIPE PIECE

This application claims the benefit of priority from European Patent Application Nos. 11 305 125.4, filed on Feb. 8, 2011; 11 305 267.4, filed on Mar. 11, 2011; and 11 305 268.2, filed on Mar. 11, 2011, the entirety of which are incorporated by reference

BACKGROUND

1. Field of the Invention

The invention relates to an arrangement with a clamp of metal constructed as a pipe piece, and with at least one clamping screw for fastening an electric conductor in the clamp, wherein the clamp has in its wall at least one throughhole provided with a thread for receiving the clamping screw, which in its construction has a circumferential intended breaking point for limiting the force which is exerted on the clamping screw by means of a tool acting on the clamping screw and effecting a rotation about its axis (EP 0 750 723 B1).

2. Description of Related Art

Such a clamping screw used in such an arrangement, also called "tear-off" or "shearing-off screw"—in the following called "screw" for short—is used, for example, in high voltage technology for connecting the electrical conductors of two high voltage cables. For achieving and maintaining an electrically well conducting contact, a fixed connection between the conductors of two cables and a pipe-shaped clamp of metal is required into which the conductors are inserted. Such a clamp advantageously is composed of an aluminum alloy. The fixed connection could be ensured by using a so called torque wrench which, when tightening the screw, "rotates through" when a sufficiently tight seat of the screw has been reached. However, such a torque wrench is frequently not available on a construction site. Therefore, the screw is as a rule tightened by means of another tool, for example, a simple wrench.

In order to ensure, and also in order to be able to monitor whether the screw has been tightened sufficiently tight, the screw can be equipped as a shearing-off screw with at least one intended breaking point which, in its axial extension, is arranged as a circumferential groove. The upper part of the screw is sheared off when the strength of its intended breaking point has been reached or exceeded. The subsequently missing screw head constitutes an indication that the screw has been tightened sufficiently tight. After the screw head has been sheared off the screw does not project, or only insignificantly projects, out of the clamp. Therefore, an insulating element to be mounted over the clamp is not mechanically damaged, nor are its insulating properties impaired. However, the intended breaking point interrupts the thread of the screw, so that its load-bearing capacity is weakened. This has a greater unfavorable effect the more such intended breaking points are present in a screw. Accordingly, a universal use of such breaking points for conductors of different diameters is only possible to a limited extent. In addition, it can frequently not be avoided that parts of the sheared-off screw protrude out of the clamp in a harmful manner.

EP 1 626 187 A1 describes a tear-off screw which is constructed as a cylindrical threaded pin with a conical bore. Arranged in the bore is a thrust element constructed as a simple cylindrical pin. The tear-off screw has over its entire length an external thread by means of which it is screwed into a threaded bore of a clamping body and onto which a cap screw can be screwed. In the mounted position, the cap screw rests against the thrust element protruding from the bore of the tear-off screw. By rotating the cap screw by means of a tool, the tear-off screw, interacting with the thrust element, is torn off along a tear-off line when it rests sufficiently tight against conductor strands arranged in the clamping body.

EP 2 226 899 A1 discloses a device for connecting two electrical conductors which includes a metal clamp constructed as a pipe piece in whose wall are arranged at least two threaded holes. For securing electrical conductors in the clamp, clamping screws are screwed in the clamp in the assembly position in the threaded holes which rest with their end faces tightly against the conductors. In the mounted position, a fixing screw is arranged in another threaded hole of the clamp, which with a wedge tip rests against the end faces of the conductors inserted into the clamp. The tip is screwed into the fixing screw by means of a thread directed opposite the external thread of the fixing screw.

The screw according to the above-mentioned EP 0 750 723 B1 has along its extension a plurality of intended breaking points constructed as circumferential grooves in the threaded part of the screw, which are arranged parallel to each other and with an axial distance relative to each other. The screw is additionally equipped with a central blind-end hole having a polygonal cross section which extends into the vicinity of the intended breaking point located closest to the screw tip. For actuating the screw, a body of rotation is provided which consists of a pin with polygonal cross section intended for insertion into the blind-end hole and with a hood completely surrounding the pin at a distance, wherein the pin is fastened to the hood and which has on the outside a hexagonal nut for placing a tool against. Because of the larger number of intended breaking points, the deficiency of the reduced load-bearing capacity already described above, applies to an even greater extent. In addition, this screw can also only be used for securing conductors with predetermined dimensions if it is the object to prevent portions of the sheared-off screw from protruding in a harmful manner from the clamp.

OBJECTS AND SUMMARY

It is the object of the invention to further develop the above-described screw in such a way that it is suitable for securing conductors of any dimensions located in a clamp without limiting its load-bearing capacity.

In accordance with the invention, this object is met in a first variation by the fact that the clamping screw has a tubular contact part that is provided with an external thread and that can be screwed into the throughhole of the clamp, wherein the contact part has at its one axial end a contact surface intended for contact with an electrical conductor located in the clamp and along its extension has a circumferential intended breaking point at a substantial distance from this contact surface, the clamping screw additionally has an actuating member which is composed of an upper part and a lower part, and can be screwed onto the contact part, and is equipped with an internal thread and a contact surface for the tool, wherein the upper part is constructed as a cap with a bottom area extending transversely of its axial direction, the actuating member is in the assembly position screwed onto the contact part such that its end face facing away from the contact surface rests against the bottom area of the upper part of the actuating member, and the contact part has a defined wall thickness which, after reaching the tight seat of the clamping screw in the clamp because of its rotation and the resulting shearing-off of the portion of the contact part located above the intended breaking point and of the upper part of the actuating member, causes tearing off of the portion of the contact part protruding out of the clamp by the bottom part of the actuating member rotated by means of the tool.

The essential part of this screw is the contact part which is the actual screw for fixing a conductor in a clamp, while the actuating member is to be considered merely an auxiliary means for moving the contact part into its end position in which a conductor is secured in a clamp. The contact part only has an intended breaking point whose position along the extension of the contact part can be chosen almost freely and is especially independent of the diameter of a conductor to be secured in a clamp. The intended breaking point only has to be sufficiently far enough away from the contact surface of the contact part, so that, after shearing-off of the upper part thereof, a sufficient length remains on which the bottom part of the actuating member can be rotated. The contact part is continuously rotated in the threaded hole of a clamp by means of a tool which acts on the upper part of the screwed-on actuating member until its contact surface rests against a conductor which is located in the clamp, has any chosen diameter, and is pressed with a predetermined force against the conductor. As soon as the desired tight seat of the contact part or of the screw has been reached, the upper part of the contact part is sheared off. It is basically of no significance what length the remaining portion of the contact part has and to what extent the latter protrudes out of the clamp, as long as the bottom part of the actuating member can remain rotatable on the actuating member. This portion of the contact part is finally torn off by the bottom part of the actuating member as soon as the latter rests on the clamp and is further rotated by means of the tool.

In a preferred embodiment, the actuating member is constructed as a single part with a circumferential breaking point located between the upper part and the lower part. However, the actuating member can also be from the outset constructed of two parts which are to be separately screwed onto the contact part, wherein one part is an upper part and the other is a lower part.

In a second variation, the object on which the invention is based is solved in that the clamping screw has a contact part which is provided with a bore and an external thread, and can be screwed into the throughhole of the clamp, wherein the contact part has at its one axial end a contact surface intended for contact with an electrical conductor located in the clamp, and with an actuating member equipped with an internal thread and a contact surface for the tool, wherein, in the assembly position, the actuating member is screwed onto the contact part, the external thread of the tubularly constructed contact part is arranged between its contact surface and the intended breaking point arranged at a significant distance from the contact surface, the contact part has in its area provided with the external thread a defined wall thickness which, after reaching the tight seat of the clamping screw in the clamp because of its rotation by means of the tool and the resulting shearing-off of the portion of the contact part located above the intended breaking point, causes tearing of the area of the contact part protruding from the clamp by the actuating member rotated by means of the tool on the external thread up to the contact with the clamp.

The essential part of this screw is also in this embodiment of the arrangement the contact part which is the actual screw for securing a conductor in a clamp. The contact part has only one intended breaking point serving for shearing-off whose position along the extension of the contact part can be chosen almost freely and is particularly independent of the diameter of a conductor to be placed in a clamp. The intended breaking point only has to be located far enough from the contact surface of the contact part, so that, after the shearing-off of the upper part, a sufficient length remains on which the actuating member can be rotated. The contact part is continuously rotated by means of a tool in the threaded hole of a clamp until its contact surface rests against a conductor located in the clamp having any chosen diameter and pressed against the conductor with a predetermined force. As soon as the desired fixed seat of the contact part or the screw is achieved, the upper part of the contact part is sheared off. It is basically without significance in this connection what length the remaining portion of the contact part has and to what extent the contact part protrudes from the clamp, and how long the actuating member can rotatably remain on the actuating member. This portion of the contact part is finally torn off by the actuating member as soon as the actuating member rests on the clamp and is further rotated by the tool.

A third solution for meeting the object on which the invention is based resides in that the clamping screw has a tubular contact part which is provided with an external thread and can be screwed into the throughhole of the clamp, wherein it has at its one axial end a contact surface intended for contacting an electrical conductor located in the clamp, wherein the clamping screw additionally has an actuating member equipped with an internal thread and a contact surface for the tool, wherein the actuating member is constructed as a pipe piece and is screwed in the assembly position onto the contact part, the actuating member is in the assembly position connected to the contact part which is fastened in the walls of both parts so as to extend in the radial direction and is equipped with an intended breaking point, and the contact part has a defined wall thickness which, after reaching the tight seat of the clamping screw in the clamp, causes, by its rotation by means of the tool and the resulting shearing-off of the pin-like holding part at its intended breaking point, tearing-off of the portion of the contact part protruding out of the clamp by the actuating member rotated by means of the tool.

Also in this case, the contact part which is once again the essential part of this screw for securing a conductor in a clamp. The actuating member is in the assembly position connected to the contact part through the pin-like holding part. Accordingly, in the assembly position, both parts form a unit. The screw formed as a result is continuously rotated by means of a tool acting on the actuating member in the threaded hole of a clamp, until the contact surface of the contact part rests against a conductor located in the clamp and having any chosen diameter and is pressed against the conductor with a predetermined force. As soon as the desired tight seat of the contact part or of the screw is reached, the holding part is sheared off. The actuating member can then be rotated on the contact part. The contact part is moved in the direction of the clamp when the holding part is rotated. The contact part is finally torn off by the actuating member as soon as the actuating member rests on the clamp and is rotated further by means of the tool.

In a preferred embodiment, the pin-like holding part forms a threaded screw with a head and a threaded shaft, wherein a circumferential restriction for producing the intended breaking point is located between a head and a threaded shaft. In the assembly position, the threaded screw is arranged with its head in a recess of the wall of the actuating member and is screwed with its threaded shaft into a threaded hole in the wall of the contact part.

BRIEF DESCRIPTION OF THE DRAWINGS

Embodiments of the subject matter of the invention are illustrated in the drawings. In the drawing:

FIG. 1 schematically illustrates, in a sectional view, a connecting point between the conductors of two electrical cables, FIG. 2 illustrates the two parts of a clamping screw according to the invention separated from each other, FIG. 3 shows the clamping screw with the parts thereof being joined together, FIG. 4 is a top view of the actuating member of the clamping screw, FIGS. 5 to 10 show different positions of the clamping screw as it is being actuated, FIG. 11 shows an embodiment of the contact part which is modified as compared to the embodiment of FIGS. 1 to 10, FIG. 12 shows an actuating member compatible with the contact part according to FIG. 11, FIG. 13 shows the two parts of the clamping screw in an embodiment deviating from the embodiment show in FIG. 2, FIG. 14 shows the clamping screw according to FIG. 13 with its parts being joined together, FIG. 15 is a top view of the clamping screw, FIGS. 16 to 21 show different positions of the clamping screw according to FIGS. 12 and 13 as they are being actuated, FIG. 22 shows three parts of an embodiment of a clamping screw deviating from that shown in FIGS. 2 and 13, shown separately from each other, FIG. 23 shows a threaded screw, on a larger scale, belonging to the clamping screw according to FIG. 22, FIG. 24 shows the clamping screw according to FIG. 22, with the parts thereof being joined together, FIG. 25 is a top view of an actuating member of the clamping screw, FIGS. 26 to 31 snow different positions of the clamping screw according to FIGS. 22 to 24 as they are being actuated.

DETAILED DESCRIPTION

In the following the shorter word "screw" continues to be used instead of the word "clamping screw." The contact part of the screw is composed of a sufficiently strong, preferably well conducting metal, for example, of brass or an aluminum alloy. The actuating member of the screw may be composed, for example, of steel. In addition, the single-piece embodiment of the fastening member is being taken into consideration, representative also of the two-part or three-part embodiments. The clamp 1 has two threaded bores in each of which is arranged a screw 2 provided with an external thread. Two electrical conductors 3 and 4 of two electrical cables 5 and 6 protrude into the clamp 1, wherein the cables 5 and 6 protrude from two different sides into the clamp; in particular the cables are energy cables. In the assembly position, the cables are secured by the screws 2 and the clamp 1 and are electrically conductively connected to each other as a result. The electrical conductors 3 and 4 are preferably of aluminum or copper. The conductors 3 and 4 can also be made of segments in which respective individual wires are combined.

The screw 2 is composed of two parts which are to be screwed together, a contact part 7, and an actuating member 8. The contact part 7 is constructed as a cylindrical hollow body with an external thread 9. For contacting an electrical conductor 3 or 4, the contact part 7 has a contact surface 10. A circumferentially extending intended breaking point 11 is provided along the length of the contact part 7, wherein the position of the intended breaking point is optional. It merely has to have a significant distance from the contact surface 10, on the one hand, and also from its end face 12 facing away from the contact surface 10, on the other hand, so that the actuating member 8 can be screwed onto the contact part 7.

The actuating member 8 is constructed as a cap with a bottom area 13 extending transversely of its axial direction. The bottom area 13 can be constructed so as to be closed. In accordance with the illustrations in FIGS. 2 and 4, it can also be constructed as a circumferential collar leaving a central throughhole. In addition, the collar can be interrupted at least once in the circumferential direction. The actuating member 8 has an internal thread 14 which is compatible with the external thread 9 of the contact part 7, wherein the internal thread 14 is interrupted along its extension by a widening portion 15 which enlarges the internal diameter of the actuating member 8. The widening portion 15 extends in the axial direction of the actuating member 8. It has an upper edge 16 and a lower edge 17. A circumferential intended breaking point 18 is mounted advantageously level with the upper edge 16 of the widening portion 15. The intended breaking point 18 divides the single-piece actuating member 8 into an upper part 19 located above the intended breaking point 18 and a lower part 20 located below the intended breaking point 18.

In accordance with FIG. 4, the actuating member 8 may have a circumferential surface constructed as a polygon, particularly a hexagon, for contact with a tool suitable for rotating the screw. However, the throughhole which may be present in the upper part 19 of the actuating member 8 may also have a polygonal cross section, preferably a hexagonal cross section, for the insertion of a corresponding tool. Above the intended breaking point 18 a preferably circumferential, radially outwardly protruding projection 21 can be mounted on the upper part 19 of the actuating member 8 which can serve as the contact surface for the tool.

The screw 2 is illustrated in the assembly state in FIG. 3. The actuating member 8 is in this case screwed onto the contact part 7 by such a distance that the end face 12 of the contact part 7 rests against the actuating member 8 at the bottom area 13. The intended breaking point 11 of the contact part 7 is located in the area of the widening portion 15 of the actuating member 8. The screw 2 manufactured in this manner is manipulated in accordance with FIGS. 5 to 10, for example, as follows, for fastening an electrical conductor 3 in a clamp 1:

Initially, the screw 2, assembled in accordance with FIG. 3, is screwed into a threaded hole of the clamp 1 until it has the position seen in FIG. 5. The screw 2 can then be brought into contact with the conductor 3, either manually or already by means of a tool—a commercially available wrench. When the screw 2 is further rotated by means of the tool, the conductor 3 is pressed together (FIG. 6). When the pressing force required for the tight seat of the screw 2 in the clamp 1 is reached or exceeded as the contact part 7 is further tightened, the contact part 7 is sheared off at the intended breaking point 11. Simultaneously, the upper part 19 of the actuating member 8 located on the contact part 7 is sheared off (FIG. 6).

The two sheared-off parts can be removed, so that only the lower portion of the contact part 7 and the bottom part 20 screwed onto the actuating part 8 remain (FIG. 7). Upon a further rotation of the bottom part 20 of the actuating member 8 on the contact part 7, the bottom part 20 comes into contact with the clamp 1. If the bottom part 20 is further rotated in this position by means of the tool with a sufficient force, the portion of the contact part 7 protruding from the clamp 1 is torn off (FIG. 9). The torn off portion can be lifted off from the clamp 1 together with the lower part 20 of the actuating member 8.

To make it possible that the portion of the contact part 7 protruding from the clamp 1 can be severed or torn off in the above-described manner, its wall thickness must be dimensioned accordingly. It must only be large enough so that the contact part 7 can transmit the force required for the tight seat of the screw 2 to the conductor 3. A greater wall thickness is not necessary. With this in mind, the wall thickness of the contact part 7 is to be dimensioned in dependence on the magnitude of the force to be applied by the tool. The final position of the securing part of the securing portion of the contact part 7 or of the screw 2 is illustrated in FIG. 10.

In accordance with FIG. 11, the contact part 7 may also have a restriction 22 extending in the axial direction which reduces its diameter, so that the restriction interrupts the external thread 9. The axial length of the constriction 22 is short in relation to the length of the contact part 7. The intended breaking point 11 is mounted at the end of the constriction 22 facing the contact surface 10. For securing the contact part 7 in a clamp 1, as it is described in connection with FIGS. 5 to 10, an actuating member 8 shown in FIG. 12 can be used, wherein the actuating member 8 has a continuous internal thread 14. However, also in this case, a two-piece actuating member 8 can be used again. When using a contact part 7 according to FIG. 11, a conductor 3 is secured in a clamp 1 in the same manner as it has been described above in connection with FIGS. 5 to 10.

The screw 2 according to FIGS. 13 to 21 consists of two parts to be screwed together, namely a contact part 23 and an actuating member 24. The contact part 23 is constructed as a cylindrical hollow body with an external thread 25. It has a contact surface 26 intended for contacting an electrical conductor 3 or 4. Along the extension of the contact part 23 is arranged a circumferential intended breaking point 27 whose position is optional. It must only be arranged at a significant distance from the contact surface 26, so that the actuating member 24, provided with an internal thread 28 and constructed as a pipe piece, can be screwed on. The external thread 25 advantageously extends only from the contact surface 26 up to the intended breaking point 27 of the contact part 23. The contact part 23 can have at its end facing away from the contact surface 26 a circumferential collar 29 which may serve as a limitation for a tool to be placed against the contact part 23.

The contact part 23 may have, in accordance with FIG. 15, above the collar 29 a circumferential surface, constructed as a polygon, particularly as a hexagon, for contacting a tool suitable for rotating the screw 2. However, the central opening of the contact part 23 can have in its upper area a polygonal cross section, preferably a hexagonal cross section, for the insertion of a corresponding tool. The actuating member 24 also may have a circumferential surface in the form of a polygon for placing the tool thereagainst.

The screw 2 is illustrated in FIG. 14 in the state of assembly. The actuating member 24 is screwed onto the contact part 23 in such a way that it rests against the collar 29. Its interior can be configured in such a way that it is expanded above the intended breaking point 27 of the contact part 23 without internal thread. The same effect can be achieved when the size of the external diameter of the contact part 23 above the intended breaking point 27 is reduced, so that an internal thread of an actuating member 24 provided with a continuously extending internal thread does not engage in this area.

The internal thread 28 of the actuating member 24, by means of which the same is screwed onto the contact part 23, is located only below the intended breaking point 27.

The screw 2 manufactured in this manner is manipulated in accordance with FIGS. 16 to 21, for example, for fastening an electrical conductor 3 in a clamp 1 as follows:

Initially the screw 2 assembled according to FIG. 14 is screwed into a threaded hole of the clamp 1 until it has the position illustrated in FIG. 16. It can then be brought either manually or already by means of a tool—a commercially available wrench—into contact with the conductor 3. When the screw 2 is further rotated by means of the tool, the conductor 3 is pressed together. When the contact pressure force required for the tight seat of the screw 2 in the clamp 1 is reached or exceeded, the contact part 23 is sheared off at the intended breaking point 27 (FIG. 17).

The sheared-off portion 30 of the contact part 23 can be removed, so that only the lower portion of the contact part 23 and the actuating member 24 screwed onto the same remain (FIG. 18). When the actuating member 24 is rotated on the contact part 23, the latter comes into contact with the clamp 1 (FIG. 19). If it is further rotated in this position by means of the tool with sufficient force, the portion of the contact part 23 protruding from the clamp 1 is torn off (FIG. 20). It can be lifted from the clamp 1 together with the actuating member 24.

In order to ensure that the portion of the contact part 23 protruding from the clamp 1 can be severed or torn off as described above, its wall thickness must be dimensioned accordingly. The wall thickness must only have a magnitude such that the contact part 23 can transmit the force required for the tight seat of the screw 2 on the conductor 3. A greater wall thickness is not required. With this in mind, the wall thickness of the contact part 3 is dimensioned in dependence on the magnitude of the force to be applied by the tool. The final position of the securing portion of the contact part 23 or of the screw 2 can be seen in FIG. 21.

In the embodiment of the arrangement according to FIGS. 22 to 31, the pin-like holding part to be inserted into the screw in the radial direction may have any chosen shape, as long as it facilitates in the assembly position the connection of contact part and actuating member into a unit. Representative for all possible embodiments, in the following description the word "threaded screw" is used instead of the word "holding part." However, it is also possible to use two or more threaded screws which are offset relative to each other in the circumferential direction of the screw.

The screw 2 consists in this embodiment of the arrangement of three parts which are to be screwed together, namely, a contact part 31, an actuating member 32, and a threaded screw 33. The contact part 31 is constructed as a cylindrical hollow body with an external thread 34. It has a contact surface 35 intended for contacting an electrical conductor 3 or 4. At its end facing away from the contact surface 35, the contact part 31 has in its wall at least one threaded hole 36 for receiving the threaded screw 33. In the area of the threaded hole 36, the wall of the contact part 31 is preferably constructed thicker so as to project radially outwardly. The external thread 34 ends before this area.

The actuating member 32 constructed as a pipe piece has an internal thread 37 and in its wall a throughhole 38 for receiving the threaded screw 33. The internal thread 37 of the actuating member 32, by means of which the same is in the assembly position screwed according to FIG. 24 onto the contact part 31, extends only over a partial area of the actuating member 32. The area of the actuating member 32, in which the throughhole 38 is arranged, can advantageously be radially expanded and made free of threads, as it is illustrated in the drawings.

In accordance with FIG. 25, the actuating member 32 can have a circumferential surface constructed as a polygon, particularly as a hexagon, for contact by a tool suitable for rotating the screw 2. However, the central opening of the actuating member 32 can have at least in the upper area also a polygonal cross section, preferably a hexagonal cross section, for the insertion of an appropriate tool.

In accordance with FIG. 23, the threaded screw 33 has a preferably conically constructed head 39 and a threaded shaft 40. Arranged between the head 39 and the threaded shaft 40 is a circumferential constriction 41 which constitutes an intended breaking point for the threaded screw 33.

The screw 2 is illustrated in the assembly state in FIG. 24. In this case, the actuating member 32 is screwed onto the contact part 31. Both parts are connected to each other by the threaded screw 33 which is screwed into the threaded hole 36 of the contact part 31 and is placed with its head 39 in the throughhole 38 of the actuating member 32. The constriction 41 and, thus, the intended breaking point of the threaded screw 33 are located in the gap between the contact part 31 and the actuating member 32.

The screw 2 manufactured in this manner is manipulated according to FIGS. 26 to 31, for example, for fastening an electrical conductor 3 in a clamp 1:

Initially, the screw 2, assembled in accordance with FIG. 24, is screwed into a threaded hole of the clamp 1 until it has assumed the position shown in FIG. 26. It can then be brought into contact with the conductor 3 either manually or already by means of a tool—a commercially available wrench. When the screw 2 is further rotated by means of the tool, the conductor 3 is pressed together (FIG. 27). When the pressing force necessary for the tight seat of the screw 2 in the clamp 1 has been reached or exceeded as it is further tightened, the threaded screw 33 is sheared off at its intended breaking point, the constriction 39 (FIG. 28).

When the actuating member 32 is further rotated on the contact part 31, it is brought into contact with the clamp 1 (FIG. 29). If it is further rotated in this position with sufficient force, the portion 42 of the contact part 31 protruding out of the clamp 1 is torn off (FIG. 30). It can be lifted off the clamp 1 together with the actuating member 32.

In order to make it possible that the portion of the contact part 31 protruding from the clamp 1 can be severed or torn off in the described manner, its wall thickness has to be dimensioned appropriately. It only has to be big enough for transmitting the force required for the tight seat of the screw 2 on the conductor 3. A greater wall thickness is not required. With this in mind, the wall thickness of the contact part 31 is to be dimensioned in dependence on the magnitude of the force to be applied through the tool. The final position of the securing portion of the contact part 31 or of the screw 2 is illustrated in FIG. 31.

The invention claimed is:

1. An arrangement for fastening an electrical conductor comprising:
    a clamp of metal constructed as a pipe piece; and
    at least one clamping screw for fastening an electrical conductor in the clamp, which in a wall of the clamp has at least one throughhole provided with a thread for receiving the clamping screw, said clamping screw being having a construction that has a circumferential intended breaking point for limiting the force which is exerted by means of a tool on the clamping screw and effects a rotation about its axis, wherein
    the clamping screw has a tubular contact part provided with an external thread and adapted to be screwed into the throughhole of the clamp, wherein the contact part has at its one axial end a contact surface intended for contacting an electrical conductor, and has along its length a circumferential intended breaking point at a significant distance from this contact surface,
    wherein the clamping screw additionally has an actuating member comprised of an upper part and a lower part and adapted to be screwed onto the contact part and equipped with an internal thread and a contact surface for the tool, wherein the upper part is constructed as a cap with a bottom area extending transversely of its axial direction,
    wherein the actuating member is in the assembly position screwed onto the contact part, such that the end face facing away from the contact surface of the contact part rests against the bottom area of the upper part of the actuating member, and
    wherein the contact part has a defined wall thickness which, after reaching the tight seat of the clamping screw in the clamp, by its rotation by means of the tool and the resulting shearing-off caused by the rotation of the portion of the contact part located above the intended breaking point, and of the upper part of the actuating member for tearing off the portion of the contact part protruding from the clamp by the lower part of the actuating member rotated by means of the tool.

2. Arrangement according to claim 1, wherein the upper part and the lower part of the actuating member are combined in a unit with a circumferential intended breaking point located between the two parts.

3. Arrangement according to claim 2, wherein the internal thread of the single-piece actuating member is interrupted approximately in the middle area thereof by a widening portion which enlarges the internal diameter of the actuating member and extends in the axial direction thereof between an upper edge and a lower edge.

4. Arrangement according to claim 3, wherein the intended breaking point of the single-piece actuating member is located approximately level with the upper edge of the widening portion.

5. Arrangement according to claim 3, wherein the intended breaking point of the contact part is located, in the assembly position, level with the widening portion of the actuating member.

6. Arrangement according to claim 2, wherein a radially outwardly projecting circumferential protrusion is located on the actuating member above the intended breaking point thereof.

7. Arrangement according to claim 1, wherein the bottom area of the upper part of the actuating member is constructed as a circumferential collar leaving a central throughhole.

8. Arrangement according to claim 1, wherein the external thread of the contact part is interrupted by a constriction which reduces the diameter of the contact part, and extends in the axial direction over a relatively short length in relation to the position of the contact part at whose end facing the contact surface the intended breaking point is located.

9. An arrangement for fastening an electrical conductor comprising:
    a clamp of metal constructed as a pipe piece; and
    at least one clamping screw for fastening an electrical conductor in the clamp, which in a wall of said clamp has at least one throughhole provided with a thread for receiving the clamping screw, and which clamping screw in its construction has a circumferential intended breaking point for limiting the force which is exerted by means of a tool on the clamping screw and effects a rotation about its axis, wherein the clamping screw has a contact part which is provided with a bore and an external thread and can be screwed into the throughhole of the clamp which at its one axial end has a contact surface intended for contacting an electrical conductor located in the clamp, and additionally an actuating member equipped with an internal thread and a contact surface for the tool, wherein the actuating member is in the assembly position screwed onto the contact part, wherein the external thread of the tubularly constructed contact part is arranged between its contact surface and the intended breaking point arranged at a substantial distance from the contact surface, and wherein the contact part has in its area provided with the external thread a defined wall thickness which, after reaching the tight seat of the clamping screw in the clamp as a result of its rotation by means of the tool and the resulting shearing-off of the portion of the contact part located above the intended breaking point, causes tearing-off of the portion of the contact part protruding out of the clamp by means of the actuating member rotated on the external thread (25) until it contacts the clamp.

10. An arrangement for fastening an electrical conductor comprising:

a clamp of metal constructed as a pipe piece; and at least one clamping screw for fastening an electrical conductor in the clamp, which in a wall of said clamp has at least one throughhole provided with a thread for receiving the clamping screw, and which clamping screw in its construction has a circumferential intended breaking point for limiting the force which is exerted by means of a tool on the clamping screw and effects a rotation about its axis, wherein the clamping screw has a tubular contact part provided with an external thread and a contact part which can be screwed into the throughhole of the clamp, wherein the contact part has at its one axial end a contact surface intended for contacting an electrical conductor located in the clamp, wherein the clamping screw additionally has an actuating member constructed as a pipe piece equipped with an internal thread and a contact surface for the tool, wherein the actuating member is in the assembly position connected tightly through at least one pin-like holding part with a contact part which is fastened in the walls of both parts so as to extend in the radial direction, and is equipped with an intended breaking point, and wherein the contact part has a defined wall thickness which, after reaching the tight seat of the clamping screw in the clamp, causes, due to its rotation by means of the tool and the resulting shearing-off of the holding part at the intended breaking point thereof, tearing-off of the portion of the contact part by the actuating member rotated by means of the tool.

11. Arrangement according to claim 10, wherein the pin-like holding part is a threaded screw with a head and a threaded shaft between which a circumferential constriction for producing the intended breaking point is located, and the threaded screw is arranged in the assembly position with its head in a tnroughhole in the wall of the actuating member, and is screwed with its threaded shaft into a threaded hole in the wall of the contact part.

\* \* \* \* \*

UNITED STATES PATENT AND TRADEMARK OFFICE
CERTIFICATE OF CORRECTION

| | |
|---|---|
| PATENT NO. | : 8,425,265 B2 |
| APPLICATION NO. | : 13/358754 |
| DATED | : April 23, 2013 |
| INVENTOR(S) | : Stauch et al. |

It is certified that error appears in the above-identified patent and that said Letters Patent is hereby corrected as shown below:

In the Claims:

Column 12, Claim 11, Line 31: The word "tnroughhole" between the words "a" and "in" should be spelled "throughhole"

Signed and Sealed this
Sixth Day of August, 2013

Teresa Stanek Rea
*Acting Director of the United States Patent and Trademark Office*